Clifton C. Farmer
INVENTOR.

United States Patent Office 2,887,929
Patented May 26, 1959

2,887,929

ADJUSTABLE EYE GLASS BOW

Clifton C. Farmer, Tacoma, Wash.

Application May 26, 1958, Serial No. 737,675

3 Claims. (Cl. 88—52)

This invention relates to adjustable eye glass bows.

As is well known, eye glass bows require adjustment at purchase and periodically thereafter to fit them to the head of the wearer. This is true also of optical instruments and certain classes of hearing aids. The adjustment is particularly difficult to make when the bows are fabricated of plastic, since in such a case remolding of the plastic is required.

It is the general object of the present invention to provide a bow for eye glasses and like devices which is longitudinally adjustable in small increments to fit the head of the wearer, thereby increasing the comfort with which the glasses are worn and insuring that correct vision is obtained. A single bow thus is made universally applicable to fitting persons having a diversity of head sizes.

The manner in which the foregoing and other objects of this invention are accomplished will be apparent from the accompanying specification and claims considered together with the drawings, wherein:

Generally stated, the adjustable eye glass bow of my invention comprises two telescoping sections having longitudinal recesses at their adjacent ends. A longitudinally extending core is seated in the recess in one of the sections, spaced from the side walls thereof. A plurality of longitudinally extending resilient fingers are seated in the recess in the other of the sections. The fingers are dimensioned for insertion in the space between the core and the side walls of the recess in the first section. Means then are provided for releasably interengaging the fingers and the core in selected positions of longitudinal adjustment, thereby varying the length of the bow accordingly.

Figure 1:
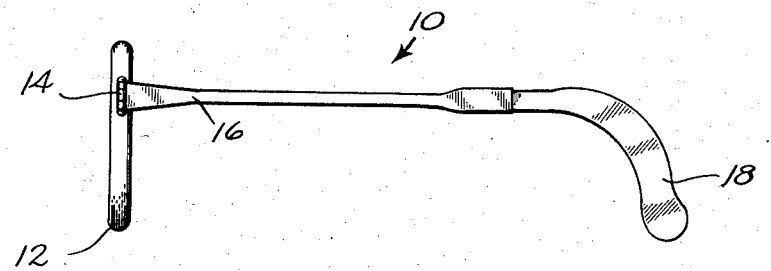
Fig. 1 is a view in side elevation of eye glasses incorporating the herein described bows.

Considering the foregoing in greater detail and with particular reference to the drawings:

As is illustrated in Fig. 1, the bow of my invention, indicated generally at 10, is adapted for use together with conventional eye glass rims 12 to which it is hinged by hinges 14. The bow is comprised of two sections, a temple section 16 and an ear clutch section 18. All of these parts of the frame may be of substantially conventional contour and made of any suitable structural material, such as plastic.

Figure 3:
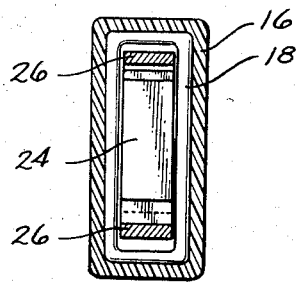
Fig. 3 is a transverse sectional view taken along line 3—3 of Fig. 2.

The bow sections may be round, square, or rectangular in cross section, as convenience and style may dictate. Preferably, however, they have a rectangular cross section as indicated in Fig. 3 so that they will lie flat against the side of the head. Their adjacent ends are telescoping and are formed with longitudinal recesses 20, 22 respectively.

A core 24 is seated in recess 22, as by being molded into the plastic from which the bow section is made. The core extends longitudinally of the recess and is so dimensioned that a space is provided between the edges of the core and the side walls of the recess. At least one pair of the opposite sides of the core are formed with serrations in the indicated manner.

Figure 2:
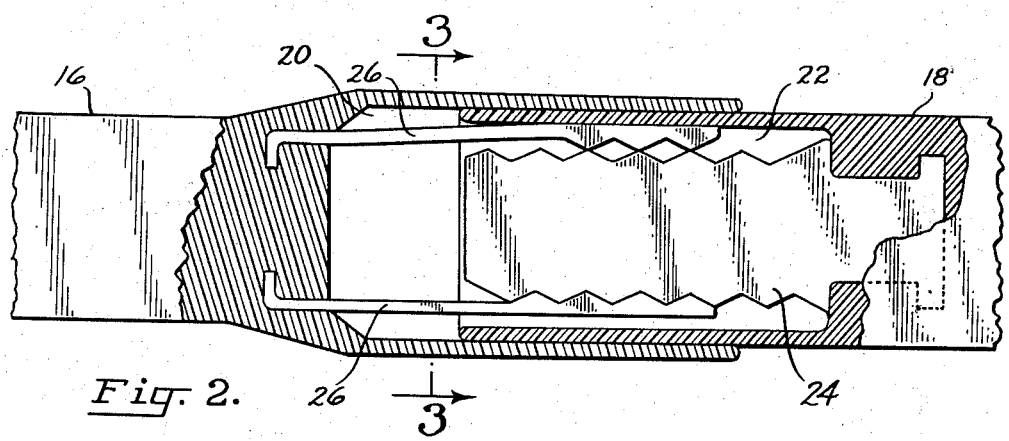
Fig. 2 is an enlarged detail view in section illustrating the adjustable elements of the bows of Fig. 1.

Fingers 26 are seated in recess 20, as by being molded directly therein when the bow section in which they are contained is made of plastic. The fingers may be formed of a resilient material, such as a resilient, non-corrodable metal. Their terminal portions are formed with opposed serrations which match or are complementary to the serrations in core 24. If desired, one pair of serrations, i.e. either those on the core or on the fingers, may register with each other substantially exactly, as do the serrations on fingers 26 in Fig. 2. The other pair, however, may be offset by one-half the length of the serrations, as are those on core 24 of Fig. 2.

Fingers 26 are dimensioned to be inserted in the space between core 24 and the side walls of recess 22. Thereupon they grip the core, interengaging the two sections of the bow. There thus is afforded a multiplicity of longitudinal adjustments limited only by the dimensions of the bow pieces and the number of serrations. Where the members of one pair of serrations are offset from each other, as in the illustrated embodiment, the number of adjustment positions is doubled.

Hence it will be apparent that by the present invention I have provided an adjustable eye glass bow which makes a single pair of eye glass frames adjustable to a large number of different positions so that the frames may be worn universally by people of all the usual head sizes without remolding or substantially altering the bows. Furthermore, adjustments can be made easily from time to time by the wearer as required for comfort and optimum vision.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An adjustable bow for eye glasses and like devices comprising two telescoping sections having longitudinal recesses at their adjacent ends, a longitudinally extending core seated in the recess in one of the sections spaced from the side walls thereof, and a plurality of resilient longitudinally extending fingers seated in the recess in the other of the sections, the fingers being dimensioned for insertion in the space between the core and side walls of the recess in the first section, and means for releasably interengaging the fingers and the core in selected positions of longitudinal adjustment.

2. An adjustable bow for eye glasses and like devices comprising two telescoping sections having longitudinal recesses at their adjacent ends, a serrated longitudinally extending core seated in the recess in one of the sections spaced from the side walls thereof, and a plurality of serrated resilient longitudinally extending fingers seated in the recess in the other of the sections, the fingers being dimensioned for insertion in the space between the core and the side walls of the recess in the first section, and the serrations on the fingers being complementary to those on the core for releasably interengaging the fingers and core in selected positions of longitudinal adjustment.

3. The adjustable bow of claim 2 wherein opposite sides of the core are serrated with the serrations offset from each other, and wherein the serrations on the opposed fingers are in substantial registration with each other, thereby providing an increased number of adjustment positions.

No references cited.